United States Patent [19]
Lucas

[11] Patent Number: 5,457,148
[45] Date of Patent: Oct. 10, 1995

[54] ONE PART ALKOXY RTV SILICONES HAVING IMPROVED THIXOTROPY

[75] Inventor: Gary M. Lucas, Scotia, N.Y.

[73] Assignee: General Electric Company, Waterford, N.Y.

[21] Appl. No.: 228,541

[22] Filed: Apr. 15, 1994

[51] Int. Cl.$^6$ ..................................................... C08K 5/54
[52] U.S. Cl. ............................... 524/731; 528/18; 525/477; 524/188
[58] Field of Search ............................... 528/18; 525/477; 524/731, 188

[56] References Cited

U.S. PATENT DOCUMENTS 4,417,042  11/1983  Dziark .
4,472,551   9/1984  White et al. .
4,483,973  11/1984  Lucas et al. .
4,515,932   5/1985  Chung .
4,528,353   7/1985  Lucas et al. .

Primary Examiner—Melvyn I. Marquis

[57] ABSTRACT

A one part room temperature vulcanizable silicone rubber composition and process for the manufacture thereof having a good application rate and good thixotropy comprises a polyalkoxy terminated polydimethylsiloxane and a low viscosity silanol stopped polydimethylsiloxane.

7 Claims, No Drawings

ONE PART ALKOXY RTV SILICONES HAVING IMPROVED THIXOTROPY

BACKGROUND OF THE INVENTION

Room temperature vulcanizable (RTV) silicone rubber compositions combining the properties of high application rate (i.e., easy to extrude and pump) and good thixotropy (i.e., non-sagging in vertical joints) have a significant advantage in the marketplace. It is therefore desirable to provide a one-component RTV silicone rubber composition having both high application rates and good thixotropic behavior.

RTV silicone sealants frequently achieve thixotropic character by the presence of high levels of fumed silica reinforcing filler. However, the level of fumed silica required for thixotropy (i.e., >12 wt. %) frequently causes drastically reduced application rates. Also, RTV silicone sealants, utilizing lower levels (i.e., <10wt. %) of fumed silica as the principle thixotrope, frequently demonstrate adequate thixotropic behavior only for a short period of time immediately after compounding. However, upon post-production storage and subsequent re-shearing of the RTV (for example, as caused by high pressure pumping during re-packaging) the thixotropy of the RTV can be significantly reduced to the extent that the RTV will flow out of a vertical joint. Reference is made, for example, to U.S. Pat. Nos. 4,483,973 and 4,528,353 (Lucas et al.) and to U.S. Pat. No. 4,472,551 (White et al.). In the RTV compositions disclosed in the Lucas and White patents, no thixotropic additives are used with the exception of fumed silica. The Lucas and White compositions are typically non-sagging as initially made but lose their thixotropic properties upon experiencing post-production shear resulting in flow out of vertical joints.

It is common practice, in the RTV industry, to utilize organic glycols, such as polypropylene glycol and polyalkylene glycol as thixotropes. However, there is no known prior art that describes the use of low viscosity, silanol terminated, linear dimethyl silicone oligomers specifically as RTV thixotropy enhancing agents.

SUMMARY OF THE INVENTION

The present invention provides silicone fluid additives that can be used to enhance the thixotropy of 1-part, alkoxy curing, RTV sealants.

The present invention also provides compositions of 1-part, alkoxy curing, RTV sealants that show improved thixotropy.

The present invention further provides a method for making, in a continuous manner, 1-part, alkoxy curing RTV's having an improved thixotropy.

The present invention relates to room temperature vulcanizable silicone rubber compositions having improved thixotropy. More particularly, the present invention relates to the discovery of 1-component, alkoxy curing, RTV compounds comprising:

1) Polyalkoxysilane endcapped dimethyl silicone polymer, 2) a tin condensation cure catalyst, and 3) a low viscosity, silanol stopped, linear dimethylsilicone fluid, present as a thixotrope; having improved thixotropy. The present invention is based on the discovery that the use of a low viscosity, silanol stopped, dimethylsilicone fluid, in certain alkoxy curing RTV silicone compositions, will result in the subsequent sealant compositions having improved thixotropy.

DESCRIPTION OF THE INVENTION

RTV sealants combining high application rates with good thixotropy are desirable. Therefore, in accordance with the first and second objects of the present invention, we disclose that incorporating low viscosity, silanol stopped, linear dimethylsilicone oligomeric additives in 1 part, alkoxy curing RTV compositions provides 1 part, alkoxy curing RTV compositions having improved thixotropy.

RTV sealants, with improved thixotropy, are obtained (in the case of translucent RTV's) by compositions comprising:

(1) 100 parts by weight of a polyalkoxy terminated PDMS (produced according to the method described by Chung - U.S. Pat. No. 4,515,932) of formula 1:

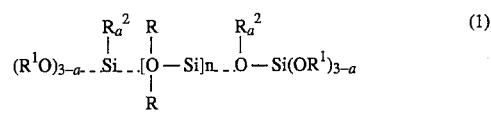

where each R and $R^2$ is independently a substituted or unsubstituted c (1–15) monovalent hydrocarbon radical, $R^1$ is a $C_{(1-8)}$ aliphatic organic radical selected from alkyl radicals, alkyl ether radicals, alkylketone radicals, alkylcyano radicals, or a $C_{(7-13)}$ aralkyl radical; "n" is a whole number ranging from about 5 to about 2500, and "a" is a whole number which is either 0 or 1. The viscosity range of the polymer of formula 1 is 50 to about 65,000 cps. at 25° C.

(2) From about 3 to about 16 parts of a reinforcing fumed silica filler. Other fillers can be used in conjunction with the reinforcing filler. Examples of these other fillers include titanium dioxide, zirconium silicate, silica aerogel, iron oxide, diatomaceous earth, carbon black, precipitated silica, glass fibers, polyvinyl chloride, ground quartz, calcium carbonate, and the like.

(3) From 0 to about 5 parts of a polyalkoxysilane crosslinking agent of formula 2:

where $R^1$, $R^2$ and "a" are a previously defined. The preferred crosslinking agent is methyltrimethoxysilane.

(4) From about 0.3 to 2.5 parts by weight of a stabilizing disilazane or polysilazane including those disclosed by Dziark (U.S. Pat. No. 4,417,042). The preferred hydroxy scavenger is hexamethyldisilazane.

(5) About 0.1 to about 0.35 parts by weight of a diorganotin-bis-diketonate condensation cure catalyst of the general formula (3):

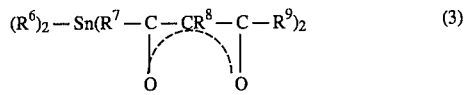

where $R^6$ is selected from one too eighteen carbon atom hydrocarbon radicals and substituted hydrocarbon radicals, and $R^7$, $R^8$, and $R^9$, are the same or different monovalent radicals selected from the class consisting of hydrogen, $R^6$, $OR^6$, $-Si(R^6)_3$, aryl, acyl, and nitrile.

Radicals included within $R^6$ of formula (3) are, for example, aryl radicals containing from 6 to 13 carbon atoms, aliphatic and halogenated aryl radicals, such as phenyl, tolyl, chlorophenyl, naphthyl; aliphatic radicals containing one to eighteen carbon atoms, cycloaliphatic radicals, and halogenated derivatives, for example cyclohexyl, cyclobutyl; alkyl and alkenyl radicals, such as methyl, ethyl, propyl, chloropropyl, butyl, pentyl, hexyl, heptyl, octyl, vinyl, allyl, and trifluoropropyl.

3

Some of the tin condensation cure catalysts included within formula(3) are, for example:
Di(n-butyl)tin-bis(acetylacetonate)
Di(n-butyl)tin-bis(benzoylacetonate)
Di(ethyl)tin-bis(lauroylacetonate)
Di(methyl)tin-bis(pivaloyacetonate)
Di(n-octyl)tin-bis(acetylacetonate
Di(n-propyl)tin-bis(1,1,1-trifluoroacetylacetonate)
Di(n-butyl)tin-bis(ethylacetoacetate)
Di(n-butyl)tin(acetylacetonate)(ethylacetoacetate).

The tin condensation catalyst can also be a diorganotin dicarboxylate such as, for example, dibutyltin, dilaurate, dibutyltin diacetate, dibutyltin dimethoxide, dibutyltin dibenzoate, dimethyltin dibutyratem and dimethyltin di-neodecanoate.

Other tin catalysts suitable for use in this invention include, for example, carbomethoxpheyltin trisuberate, tin octoate, isobutyltin triceroate, triethyltin tartrate, tin oleate, tin naphthenate, butyltin tri-2-ethylhexoate, and tin butyrate.

(6) From about 0.1 to about 1,5 parts by weight of a low viscosity, silanol stopped, linear dimethylsiloxane oligameric thixotrope of formula (4):

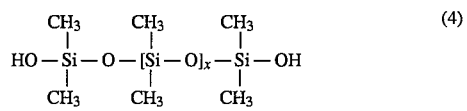

(4)

wherein x ranges from about 4 to about 10 and the viscosity of ranges from about 1 to about 30 centipoise at 25° C.

Optionally, if primerless adhesion is desired, adhesion promoting polyalkoxy organosilanes may be used in the RTV composition of the present invention. These organosilane adhesion promoting additives (of formula 5) can be used at levels from 0.1 to 2 wt. %:

(5)

where R, R', are $C_{1-8}$ monovalent hydrocarbon radicals, "a" varies from 0 to 3, and X is a saturated, unsaturated, or aromatic hydrocarbon which may be further functionalized by a member selected from the class consisting of epoxy, amino isocyanato, acryloxy, and acyloxy. The preferred adhesion promoters are 1,3,5-tris-trimethoxysilylpropylisocyanurate and gammaglycidoxyproplytrimethyoxsilane.

Optionally, if medium to low modulus properties are desired, there can be used, as plasticizers in the RTV compositions of the present invention, from about 1 to about 50 wt. % of a linear triorganosilyl endstopped diorganopolysiloxane having a viscosity of 50 to 5000 centipoise at 25° C. The organo groups are monovalent hydrocarbon radicals, preferable of from 1 to 8 carbon atoms. Such plasticizers are free of silanol groups.

In accordance with the third object, of the present invention, the method for the manufacture of a 1-part, alkoxy curing RTV with improved thixotropy, will now be described. The method used to prepare the above thixotropic RTV compositions is a critical aspect of the present invention. In particular, achievement of improved thixotropy is dependent on the order of addition of the RTV inputs during manufacture. The polyalkoxy terminated PDMS polymer is added first, to a suitable mixing device, followed by the addition of the low viscosity silanol stopped fluid thixotrope. The reinforcing filler is added next followed by High shear blending at temperatures between 50°–100° C. Plasticizer, crosslinker, tin catalyst, disilazane scavenger, and adhesion promoter are added separately or together, at a later time.

A detailed description of the continuous manufacture, of the above thixotropic RTV compositions, using a WP extruder, is given in example 2.

4
EXAMPLES

EXAMPLE 1

Example 1 describes the preparation of the low viscosity silanol stopped fluid used as a thixotrope in the present invention.

Into a suitable reaction vessel, equipped with an agitator, heater, nitrogen purge, and vacuum source, was charged 109 parts by weight dry acetone, 10 parts by weight water, and 2 parts by weight Bentonite clay quartz ( Super Filtrol grade #20). These ingredients were mixed at moderate speed for 15 minutes. 100 parts by weight molten methyl trimer (hexamethyltrisiloxane) was charged to the vessel and mixed at 50°–60° C. for 6 hours at which time the unreacted trimer was reduced to less than 5%. 1.3 parts by weight magnesium oxide and 1.0 parts by weight calcined diatomaceous earth (Celite 545) was charged and mixed 30 minutes. The reaction mixture was cooled to 25 ° C. and filtered. Acetone was stripped away, under partial vacuum, at a maximum temperature of 55° C. leaving the finished product. After stripping, the product was cooled to 25° C. and tested for:

silanol level: 5–8 wt. % viscosity: 3–10 cps color: colorless trimer level: <5 wt. %

EXAMPLE 2

Example 2 describes the continuous preparation of a low viscosity silanol stopped fluid containing SRN RTV compositions using a 14 barrel, 30 mm, Werner-Pfliederer twin screw extruder.

The first four zones of the extruder were heated to 70°–80° C. The 5th zone was cooled to minus 10 –0° C. To barrel 1, of the extruder, there was continuously added 100 parts by weight methyl dimethoxy terminated PDMS polymer, viscosity, 30,000 cps, 10 parts by weight of a $D_4$ treated fumed silica filler, and 0.7 parts by weight of a low viscosity silanol stopped fluid thixotropy additive. In barrel 8 there was continuously added 18.6 parts by weight plasticizing fluid. In barrel 13 there was continuously added 0.7 parts by weight methyltrimethoxysilane, 0.7 parts by weight glycidoxypropyltrimethoxysilane, 1 parts by weight hexamethyldisilazane, and 0.35 parts by weight dibutyltin bis (acetylacetonate). RTV sealant was continuously produced at 50 lb/hr. The finished RTV exited the WP at 35° C. and was packaged into 6 oz. Semco® tubes fitted with mixing impellers.

After 7 days room temperature storage, the Semco® tubes, containing the RTV sealant were sheared, on a Serokit® mixer, for 15 minutes to simulate post-production shear experience during RTV packaging. Boeing flows (WPSTM-E-48) were determined by filling the Boeing Flow jig cavity via extrusion from a Semco® tube fitted with a ⅛ inch aperture nozzle at 90 psi. Flows of >0.3 inch are considered unacceptably high.

Sealant application rates were determined by weighing the amount of sealant extruded form a Semco® tube fitted with a ⅛ inch nozzle in 1 minute at 90 psi. Application rates <100 gin/rain are considered unacceptably low.

The above procedure was repeated using 11.4, 12.9 and 14.3 parts by weight $D_4$ treated fumed silica filler. Boeing flow and application rate (AR) results were measured with the following results:

| D₄ Treated Silica Level (parts by weight) | Boeing Flow (inch) | AR (gm/min) |
| --- | --- | --- |
| 10 | 1.4 | 625 |
| 11.4 | 0.30 | 565 |
| 12.9 | 0.20 | 445 |
| 14.3 | 0.10 | 420 |

EXAMPLE 3

Example 3 is a repeat of example 2 but 1.4 parts by weight low viscosity silanol stopped fluid thixotrope additive was used. Boeing flow and AR results are as follows:

| D₄ Treated Silica Filler | Boeing Flow (inch) | AR (gm/min) |
| --- | --- | --- |
| 10 | 0.65 | 580 |
| 11.4 | 0.25 | 450 |
| 12.9 | 0.10 | 385 |
| 14.3 | 0.05 | 385 |

EXAMPLE 4

Example 4 is a repeat of example 2 however in contrast low viscosity silanol stopped fluid thixotrope was not added to the formulation. Boeing flow and AR results are as follows:

| D₄ Treated Silica Filler Level (parts by weight) | Boeing Flow (inch) | AR (gm/min) |
| --- | --- | --- |
| 10 | >4.5 | 720 |
| 11.4 | >4.5 | 560 |
| 12.9 | 3.80 | 500 |
| 14.3 | 2.70 | 440 |

EXAMPLE 5

Example 5 is a repeat of example 2 but the low viscosity silanol stopped fluid thixotrope was added to WP barrels 8 & 13 respectively. Boeing flow and AR results are as follows:

| Low Viscosity Silanol Stopped Fluid Added to WP Barrel 8 | | |
| --- | --- | --- |
| D₄ Treated Silica Filler Level (parts by weight) | Boeing Flow (inch) | AR (gm/min) |
| 10 | 1.80 | 650 |
| 11.4 | 0.90 | 575 |
| 12.9 | 0.75 | 445 |
| 14.3 | 0.55 | 435 |

| Low Viscosity Silanol Stopped Fluid Added to WP Barrel 13 | | |
| --- | --- | --- |
| D₄ Treated Silica Filler Level (parts by weight) | Boeing Flow (inch) | AR (gm/min) |
| 10 | 2.10 | 625 |
| 11.4 | 1.50 | 575 |
| 12.9 | 0.90 | 450 |
| 14.3 | 0.75 | 425 |

EXAMPLE 6

Example 6 describes the continuous WP extruder preparation of Sealant N RTV compositions containing 0.7 parts by weight low viscosity silanol stopped fluid thixotrope.

To barrel 1, of the WP extruder, there was continuously added 100 parts by weight methyldimethoxy terminated PDMS polymer, viscosity 30,000 cps., 10 parts by weight D4 treated fumed silica filler, and 0.7 parts by weight low viscosity silanol stopped fluid thixotrope, In barrel 8, of the WP extruder, there was continuously added 18.6 parts by weight plasticizing fluid. In barrel 13 there was continuously added 0.7 parts by weight methyltrimethoxysilane, 0.4 parts by weight glycidoxypropyltrimethoxysilane, 3 parts by weight hexamethyldisilazane, and 0.35 parts by weight dibutyltin diacetate. RTV sealant was continuously produced at 50 lb/hr. Boeing flow and AR results are as follows:

| D₄ Treated Silica Filler Level (parts by weight) | Boeing Flow (inch) | AR (gm/min) |
| --- | --- | --- |
| 10 | 1.30 | 650 |
| 11.4 | 0.30 | 575 |
| 12.9 | 0.25 | 450 |
| 14.3 | 0.15 | 400 |

EXAMPLE 7

Example 7 is a repeat of example 6 but 1.4 parts by weight low viscosity silanol stopped fluid thixotrope were used. Boeing flow and AR results are as follows:

| D₄ Treated Silica Filler Level (parts by weight) | Boeing Flow (inch) | AR (gm/min) |
| --- | --- | --- |
| 10 | 0.55 | 620 |
| 11.4 | 0.25 | 520 |
| 12.9 | 0.10 | 400 |
| 14.3 | 0.05 | 400 |

EXAMPLE 8

Example 8 is a repeat of example 7 however in contrast low viscosity silanol stopped fluid thixotrope was not added to the RTV composition. Boeing flow and AR results are as follows:

| D₄ Treated Silica Filler Level (Parts by weight) | Boeing Flow (inch) | AR (gm/min) |
|---|---|---|
| 10 | >4.5 | 750 |
| 11.4 | >4.5 | 600 |
| 12.9 | 3.50 | 525 |
| 14.3 | 2.50 | 450 |

Having described the invention, that which is claimed is:

1. A one part alkoxy room temperature vulcanizable rubber composition comprising:
   (a) a polyalkoxy terminated polydimethylsiloxane;
   (b) a silanol stopped dimethyl silicone fluid of the formula:

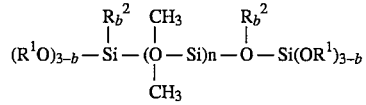

wherein x ranges from about 4 to about 10;
   (c) a reinforcing fumed silica filler;
   (d) a polyalkoxysilane cross-linking agent of the formula:

$(R^1O)_{4-a}—Si—R^2_a$ where a is either zero or one and $R^1$ is a one to eight carbon organic radical selected from the group consisting of alkyl radicals, alkyl-ketone radicals, alkylcyano radicals, and seven to thirteen carbon atom aralkyl radicals, and $R^2$ is a substituted or unsubstituted one to fifteen carbon atom hydrocarbon radical;
   (e) a disilazane or polysilazane; and
   (f) an organo tin condensation cure catalyst.

2. The composition of claim 1 wherein said organo tin condensation cure catalyst is a diprganatin dicarboxylate.

3. The composition of claim 1 wherein the viscosity of the dimethyl silicone fluid ranges from about 1 to about 30 centipoise at 25° C.

4. The composition of claim 1 wherein the polyalkoxy terminated polydimethylsiloxane has the formula:

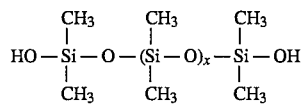

where $R^2$ is a substituted or unsubstituted $C_{(1-15)}$ monovalent hydrocarbon radical, $R^1$ is a $C_{(1-8)}$ aliphatic organic radical selected from the group consisting of alkyl radicals, alkyl ether radicals, alkylketone radicals, and alkylcyano radicals, or a $C_{(7-13)}$ aralkyl radical; n is a whole number ranging from about 5 to about 2500, and b is a whole number which is either 0 or 1.

5. The composition of claim 1 further comprising an adhesion promoter having a formula:

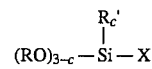

where R, R', are $C_{1-8}$ monovalent hydrocarbon radicals, "c" varies from 0 to 3, and X is a saturated aliphatic, unsaturated aliphatic, or aromatic hydrocarbon wherein X may have substituents selected from the group consisting of epoxy, amino-isocyanato, acryloxy, and acyloxy groups.

6. A composition consisting essentially of:
   (a) a polyalkoxy terminated polydimethyl-siloxane of the formula:

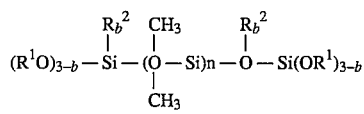

(b) A silanol stopped dimethyl silicone fluid of the formula:

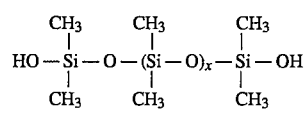

wherein x ranges from about 4 to about 10;
   (c) a condensation cure catalyst comprising a catalytic tin compound;
   (d) a reinforcing silica filler;
   (e) a polyalkylsilane crosslinker; and
   (f) an adhesion promoter of the formula:

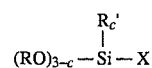

where R and $R^1$ are $C_{1-8}$ monovalent hydrocarbon radicals, c varies from 0 to 3, and X is a saturated aliphatic, unsaturated aliphatic, or aromatic hydrocarbon wherein X may have substituents selected from the group consisting of epoxy, amino-isocyanatic, acryloxy, and acyloxy groups and wherein the polydimethyl-siloxane of (a) is subject to the limitation that $R^2$ is a substituted or unsubstituted $C_{(1-15)}$ monovalent hydrocarbon radical, $R^1$ is a $C_{(1-8)}$ aliphatic organic radical selected from the group consisting of alkyl radicals, alkyl ether radicals, alkyl ketone radicals, and alkylcyanoradicals or $C_{(7-13)}$ aralkyl radicals; n is a whole number ranging from about 5 to about 2500, and b is a whole number which is either 0 or 1.

7. A method for making a one part room temperature vulcanizable silicone rubber having good thixotropy comprising in order the steps of:
   (a) adding a polyalkoxy terminated polydimethylsiloxane to a mixing device;
   (b) blending a silanol stopped dimethyl silicone fluid of the formula:

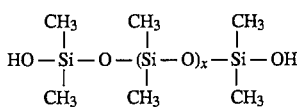

wherein X ranges from about 4 to about 10 to said polyalkoxy terminated polydimethylsiloxane in said mixing device;

(c) blending a reinforcing filler thereby producing a mixture;

(d) blending said mixture at a temperature ranging from 50° to about 100° C.;

(e) blending a condensation cure catalyst comprising a catalytic tin compound;

(f) blending a disilazane scavenger; and optionally (g) blending an adhesion promoter of the formula:

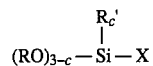

where R and $R^1$ are $C_{1-8}$ monovalent hydrocarbon radicals, c varies from 0 to 3, and X is a saturated aliphatic, unsaturated aliphatic, or aromatic hydrocarbon wherein X may have substituents selected from the group consisting of epoxy, amino-isocyanato, acryloxy, and acyloxy groups.

* * * * *

UNITED STATES PATENT AND TRADEMARK OFFICE
CERTIFICATE OF CORRECTION

PATENT NO. : 5,457,148
DATED      : October 10, 1995
INVENTOR(S) : Gary M. Lucas It is certified that error appears in the above-indentified patent and that said Letters Patent is hereby corrected as shown below:

On title page, item [21], the Application Number is incorrectly listed as 228,541; the correct Application Number should be 228,542.

Signed and Sealed this

Twenty-seventh Day of February, 1996

*Attest:*

BRUCE LEHMAN

*Attesting Officer*     *Commissioner of Patents and Trademarks*